TRANSMISSION SYSTEM FOR CARRIER-WAVE TELEPHONY

Filed June 9, 1954 3 Sheets-Sheet 1

INVENTORS:
J.M. DOUWES DEKKER
WILLEM BEIJNINK
BY Hugh D. Kirk
ATT'Y

June 30, 1959 J. M. DOUWES DEKKER ET AL 2,892,903

TRANSMISSION SYSTEM FOR CARRIER-WAVE TELEPHONY

Filed June 9, 1954 3 Sheets-Sheet 2

INVENTORS:
J.M. DOUWES DEKKER
WILLEM BEIJNINK
BY Hugh A. Kirk
ATT'Y

TRANSMISSION SYSTEM FOR CARRIER-WAVE TELEPHONY

Filed June 9, 1954

3 Sheets-Sheet 3

INVENTORS:
J.M. DOUWES DEKKER
WILLEM BEIJNINK
BY Hugh A. Hink
ATT'Y 2,892,903

TRANSMISSION SYSTEM FOR CARRIER-WAVE TELEPHONY

Jan Maurits Douwes Dekker, The Hague, and Willem Beijnink, Eindhoven, Netherlands, assignors to Staatsbedrijf der Posterijen, Telegrafie en Telefonie, The Hague, Netherlands Application June 9, 1954, Serial No. 435,648

Claims priority, application Netherlands June 16, 1953

8 Claims. (Cl. 179—170)

The invention relates to a carrier-wave telephone transmission system using for the transmission a number of circuits of existing low-frequency telephone cables.

THE PRIOR ART

Known systems providing a solution, to a greater or smaller extent, for the problems of increasing the number of two-way telephone channels over existing low frequency telephone cables are for example: the American K-System (see Bell System Technical Journal, January 1938, pages 80 to 105: "A Carrier-Telephone System for Toll Cables" by Green) and the American N1-System (see Bell System Technical Journal, January 1951, pages 1 to 32: "The Type N1-Carrier-Telephone System, Objectives and Transmission Features").

The K-system uses a frequency band of 12 to 60 kc./s., accommodating 12 channels. One sideband with a suppressed carrier-wave is transmitted. For the go and return circuit of a connection separate cables are employed. An important factor hindering an ample and general employment of such systems resides in the pronounced crosstalk phenomenon between the low-frequency conductors occurring in general at high frequencies. Therefore the success in this respect has been slight; the better circuits had to be selected, the frequency range had to be restricted, substantial balancing measures were required and at the repeater-points for the carrier circuits filters had to be provided in all the conductors which remained in use for low-frequency operation.

If only one cable was available, a second cable had to be provided. In other cases the frequency band has been split up into two parts, one part for the go channels and one for the return channels, for example a 12+12 channel system, which has the disadvantage of the higher frequency and a slightly more complicated construction and maintenance of the terminal apparatus. Such a complex of measures can be carried out only with difficulty and requires considerable additional expenses before the economical use of the carrier-wave method is realized. With important communications these measures have been carried out; for many shorter communications this has proved to be too unattractive.

The N1-system tends to solve various of the said difficulties; in this system the cross-talk difficulties are obviated without elaborate balancing operations by using "compandors" and "frequency frogging." With frequency frogging the frequency bands are interchanged in the intermediate amplifiers (repeaters). In the N1-system the two sidebands of each channel are transmitted, with the carrier-wave, so that 12 channels require the transmission of a band of 96 kc./s. For opposite directions various frequency bands are transmitted, i.e. 44 to 140 kc./s. in one direction and 164 to 260 kc./s. in the other direction. In each repeater these bands interchange their directions by means of a modulation stage (see Fig. 1, page 5 of the said article). This is termed "frequency frogging" and it tends to reduce cross talk through continuous conductors (not interrupted by an amplifier), since in each frequency band the same level prevails on either side of the repeater point. Nevertheless the expensive "compandors" have been used to fulfil reasonable cross-talk requirements.

THE OBJECTS AND INVENTION

The system according to the invention also utilizes repeaters which can be fed through the same cable, whilst no balancing measures at all or only very simple balancing measures are required; these repeaters are considerably simpler than those used in the N1-system, since no modulator stage and hence no oscillator is required.

The system according to the invention also provides a considerably greater liberty in the modulation system of the terminal apparatus and the use of compandors may be dispensed with. However, this system is capable of transmitting a much greater number of channels per wire pair.

Compared with the K-system, the system according to the invention has inter alia the advantage that for the go and return circuits use may be made of conductors of the same cable without carrying out special screening measures.

A practical advantage is that the introduction of the system into existing low-frequency cables can be carried out comparatively readily, since in this case only a low percentage of the total number of conductors is involved, whilst a very important extension of the number of channels is obtainable.

The said advantages are obtained by combining a number of partly known ideas which are united in a harmonic manner.

The first fundamental idea of the invention lies in the fact known per se that the difficulties with various kinds of cross-talk are the more pronounced, the greater is the amplification at each repeater point.

Extensive measurements carried out at existing cables have proved that the near-end cross-talk was on an average about 20 db better than the far-end cross-talk. This means that with an amplification factor of 20 db, without balancing, the influence of the two kinds of cross-talk is the same. The difficulties caused by cross-talk through low-frequency circuits, remaining in use at the carrier-wave repeater points also tend to increase with the amplification factor. The system according to the invention therefore suggests to use a considerably lower amplification factor (lower than 25 db) than the conventional factor (about 60 db).

It is a new idea that all phenomena producing the so-called indirect far-end cross-talk (which increases in general more strongly with an increase in length of the repeater section than the direct cross-talk) are strongly reduced in harmony with this decrease in amplification factor. This is the more important, since with low-frequency cables great difficulties are encountered with couplings through third circuits. Confer for example "Cable et Transmission" January 1953, pages 54 and 78, a French article entitled "La Diaphonie entre paires d'un cable a circuits symetriques pour courants porteurs par l'intermediaire d'un troisieme circuit" par Bourseau and Jarrosson.

Some of these so-called "third circuits" may, moreover, have a considerably lower attenuation than the circuits used for the transmission; and they are in general at the same time rather intimately coupled with the effective circuits. Then a cross-talk path is formed from circuit I to II through III as follows: cross-talk from I to III at the beginning of the cable; transmission through III; cross-talk from III to II at the end of the cable. Owing to the difference in transit time generally prevailing between the transmission through III as compared with I and II this kind of cross-talk increases in a very arbitrary manner with the direct cross-talk, so that the simple balancing methods for the far-end cross-talk at the ends of the cable are no longer effective.

By using intermediate amplification the level relationship between the effective signal and the level at the end of circuit III is more favourable, so that the effect of the kind of cross-talk described above is considerably reduced in a stretch of the same length.

Thus the cross-talk value can become more favourable, and at the same time it is possible to balance at the end of a complete stretch with intermediate amplifiers; this would not be possible, if the same stretch were operated with one amplifier at the end (which would have to exhibit, of course, an amplification factor equal to the sum of all amplifiers used in the alternative case).

A second fundamental idea of the system according to the invention resides in that owing to the reduced amplification factor, the wide-band amplifier may consist of a single stage amplifier, which requires so little energy that a considerable number of these amplifiers can be fed in cascade through the line itself by comparatively low supply voltages.

The third fundamental idea is that by suitable choice of the slope of the attenuation characteristic curve of the cable section (which appears to correspond substantially to a maximum attenuation of not more than 25 db) the equalization can be carried out in a simple manner, the frequency-dependent variation being controlled primarily by one element (for example a capacitor) in the negative feed-back dipole (or the tripole).

A fourth fundamental idea resides in the fact that by using multi-channel systems with very many channels per wire circuit, the disadvantage of the higher frequencies is more than offset by the reduction in the number of circuits required for carrier operation, because an efficient choice of these circuits is now possible. Thus, without preliminary measurements the conductors to be used for carrier-wave operation can be selected. With known composition of the cable this selection based on the relative position and the twist length, may easily yield the number of circuits required, which meet the cross-talk requirements, even for the higher frequencies, either without any balancing or only with slight balancing. A practical advantage of the system according to the invention, already referred to above, is that the system can be readily introduced into existing cables, since by the systematic choice, very circuitous measurements which cost much time, during which the cable must be taken out of operation completely or for a large part for a long time, are obviated.

The combination of the ideas referred to above constitutes the essential value of the invention; with reference to a practical embodiment and to a few figures the invention will now be described more fully.

With existing systems the tendency is to render the section length between two repeater points as large as possible, in order to minimize the number of repeaters and hence the cost.

The maximum distance allowed for the amplifiers in the line is determined by the signal-noise ratio on the one hand and by the energy to be supplied to the cable on the other hand. In order to guarantee a satisfactory intelligibility of the speech subsequent to amplification, the lowest level in the cable, prior to amplification, must exceed considerably the noise level.

Moreover, the relationship between the amount of energy supplied by an amplifier and the cost of the amplifier is not proportional, the cost increasing out of proportion beyond a given energy limit. Therefore, with existing systems, the amplifier interval had a maximum attenuation of about 60 db for the highest frequencies to be used. The amplifier to be used had to provide an amplification of about 60 db under the same conditions. Considering the influence of this high amplification degree on cross-talk, one may distinguish between near-end cross-talk and the indirect far-end cross-talk.

The near-end cross-talk requires, as is known, a value (in db or Nepers) of cross-talk between the cable conductors concerned equal to the sum of the finally desired cross-talk value and the amplification factor of the amplifier.

It is obvious that with the amplification factors hitherto applied this gives rise to requirements for the direct near-end cross-talk which cannot be fulfilled with carrier-wave frequencies without separating the wires for the go and return circuits by housing them in separate lead sheaths or by providing at least a special screening.

In the indirect far-end cross-talk one may distinguish three kinds, i.e.

(1) at the repeater points through the conductors not interrupted by amplifiers;

(2) through third circuits, among which circuits coupled very strongly with the two conductors concerned used for carrier-wave transmission. (This kind of cross-talk becomes very manifest with star-quad cables between two side-circuits of the same quad (see inter alia "Cables et Transmission," January 1953 page 78). It occurs already with comparatively short lengths, and increases, in principle, much more with the length than the direct cross-talk which increases approximately proportionally to the square-root of the length);

(3) through third circuits having a materially lower attenuation than those used for carrier-wave transmission. (This kind of cross-talk also increases much more strongly with an increasing length than the direct cross-talk.)

The kinds of cross-talk referred to in 2 and 3 are moreover, in general, characterized in that they increase approximately with the square of the frequency, in contradistinction to the direct cross-talk, which increases, in general, linearly with frequency.

Hitherto these facts have led to no other conclusions than that the carrier wave conductors had to be balanced very carefully or screened and that the frequency band to be used had to be confined to those frequencies at which the cross-talk values (taking into consideration a high amplification factor) were acceptable.

According to the invention the effect of all these disadvantages may be materially reduced by reducing the amplification factor.

With respect to near-end cross-talk we may state that, if the amplification factor is reduced to less than 25 or 30 db, very high frequencies (about 200 to 300 kc./s.) may be used in normal low-frequency cable on a few side-circuits in both directions, as has been proved by extensive measurements.

With star-quad cables, the duplex circuits yield, as is known, even more favourable cross-talk values. Therefore on these circuits the same frequency band may be used in both directions within the same cable to materially high frequencies (of about 500 to 600 kc./s.). Taking the relative positions and the twist lengths into consideration, we can indicate these circuits systematically. Extensive incidental measurements to find a few conductors which happen to exhibit favourable cross-talk values may be dispensed with, as well as balancing measures, which are otherwise for near-end cross-talk so circuitous that they may be considered impracticable.

The indirect far-end cross-talk in the three forms referred to above is also reduced by reducing the amplification factor (and hence the section attenuation) to less than 25 to 30 db, to such an extent that it becomes unimportant with respect to the direct far-end cross-talk which can be balanced not only in a more efficient but also a simpler manner.

By suitable systematic choice, a number of circuits can be indicated in conventional low-frequency cables being satisfactorily free from far-end cross-talk up to high frequencies.

From measurements it has been found that, apart from balancing, this small specially selected number of conductors can be driven to so much higher frequencies that a greater number of channels can be transmitted across them than with the use of a larger number of wire pairs, the highest frequency being, of course, much lower owing to the stronger cross-talk couplings between these wires.

Particularly for the introduction of carrier-wave systems into existing coil-loaded cables, it is of great importance that the conductors to be used should be selectable by a systematic choice, since it would otherwise be required to block the cable from service for a long time, to switch out all loading coils, in order to carry out the required, very extensive cross-talk measurements, and to switch on again the loading coils in those wire pairs which are not to be used for carrier-wave transmission. By carrying out the measurements in two or more stages, the cable could be kept partly in operation but this would certainly introduce additional loss of time. Formerly a two or three-stage amplifier was required; but with the system according to the invention an amplifier having one stage (one tube) has been developed.

The attenuation in the cable increases with the frequency. In order to equalize the linear distortion there are two methods:

(1) Introducing a so-called equalization network, providing additional attenuation for the low frequencies;

(2) The amplification factor of the amplifier is caused to vary automatically in a manner such that the high frequencies are amplified more than the lower frequencies.

Moreover, the two methods may be combined.

With the second method the ascension of the frequency characteristic curve is obtained, in general, by including an equalization network in the feed-back path of the amplifier.

In the equalization networks the frequency characteristic curve of the cable must be reproduced either inverted (with the first method) or direct (with the second method).

Since under normal conditions this characteristic curve has a very steep slope in a comparatively wide frequency band, whilst the equalization networks have, in general, to fulfil comparatively severe requirements with respect to the input impedance, they are usually rather complicated; all elements having to fulfil, moreover, severe tolerance requirements.

With the system according to the invention this equalization network is included in the amplifier in the form of a very simple negative feed-back network. This negative feed-back network may, for example consist of a dipole formed mainly by a capacitor included in the cathode lead of the only amplifying tube. For a capacitor the impedance is twice as small for a frequency twice as high (a frequency interval of one octave). This yields a negative feed-back ratio twice as low or an amplification ratio twice as high or, expressed in db 20 log 2=6 db (per octave). The slope of the amplification curve of the amplifier is thus approximately 6 db per octave. If the slope of the attenuation curve of the cable section is also 6 db per octave, the requirement that the residual attenuation should be the same for all frequencies concerned is fulfilled. In practice this yields cable lengths having a maximum attenuation of about 25 db for the highest frequency desired and this means a cable length of 2.5 to 7 kms., in accordance with the type of cable (this cable length is designated hereinafter by $p$ kms.).

The figures:

The above mentioned and other features and objects of this invention and the manner of attaining them will become more apparent and the invention itself will be best understood by reference to the following description of embodiments of the invention taken in conjunction with the accompanying drawings, wherein.

Figure 6:
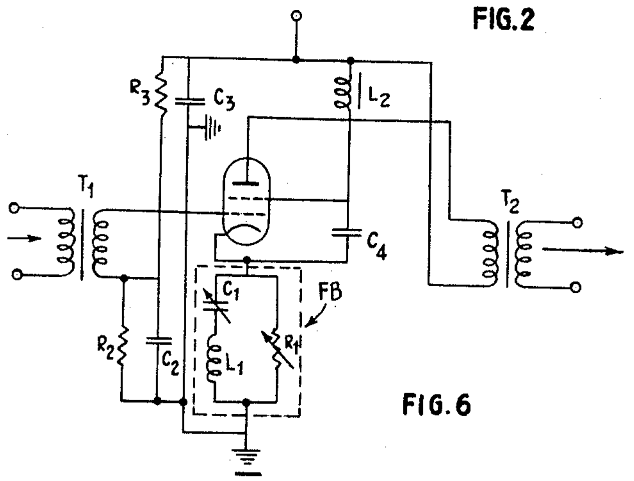
Figure 4A:
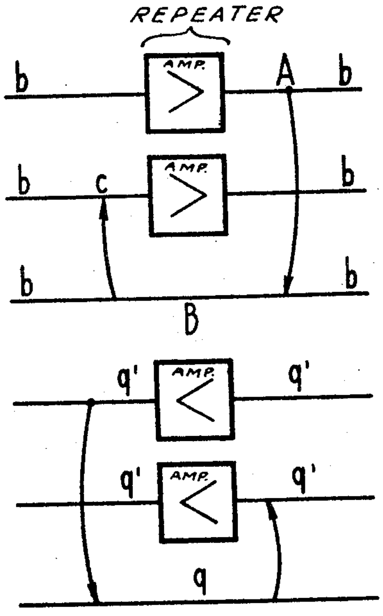
Figure 4B:
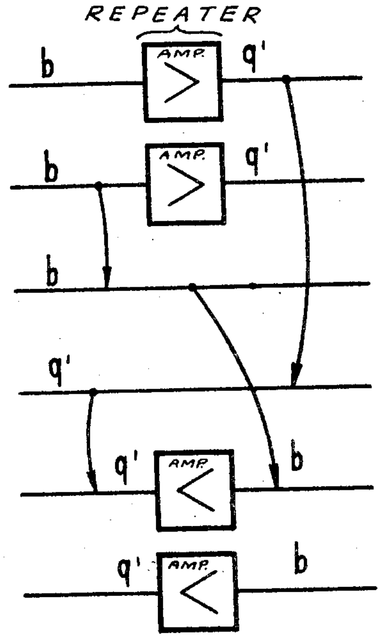
Figure 5A:
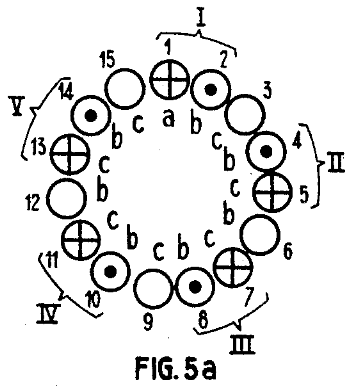
Figure 5B:
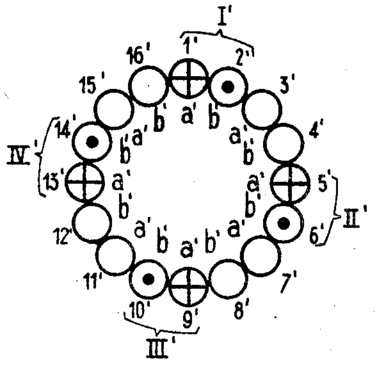
Figures 5C, 5D:
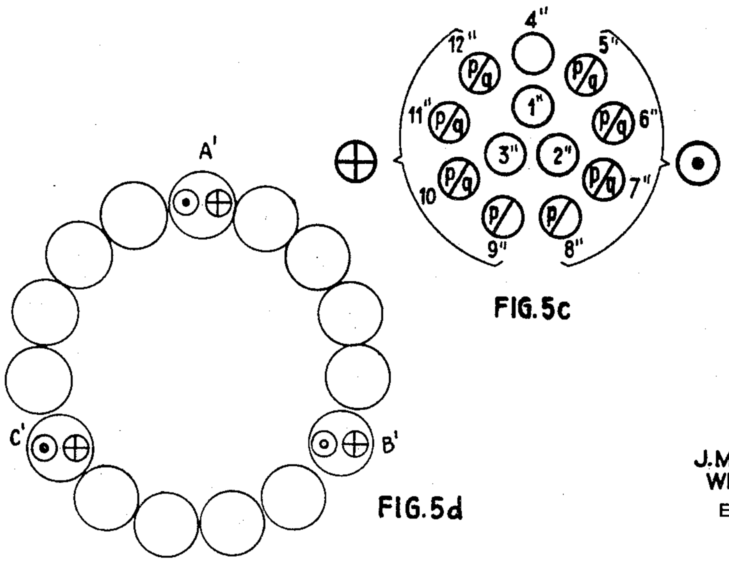

Fig. 4 comprises a schematic wiring diagram of sections of six conductor wires illustrating crosstalk at the inputs and outputs of two amplifiers in each direction at a repeater station; with Fig. 4*a* showing a conventional arrangement with serious crosstalk problems indicated by the arrows connecting the horizontal lines between wires having the same twist lengths, and Fig. 4*b* showing the arrangement according to the present invention in which "group frogging" is employed to avoid connections between the input and output of amplifiers to cables of the same twist lengths;

Fig. 5 shows schematic cross sections of arrangements of four wire quads of conductors or wires in four different types of cables and the selection of pairs of go and return carrier channels according to the present invention, with Fig. 5*a* showing a layer of a cable having fifteen star quads of three different twist lengths; Fig. 5*b* showing a layer of standard cable having sixteen star quads of only two different twist lengths; Fig. 5*c* showing a section of cable for carrier frequencies with each star quad having a different twist length; and Fig. 5*d* showing a layer of cable having fifteen star quads with three equidistant quads having pairs of wires of different twist lengths; and Fig. 6 shows a wiring diagram of a circuit of a single simple repeater amplifier and its equalizing circuit for one direction of carrier transmission according to this invention.

THE DETAILED DESCRIPTION

Figure 1:
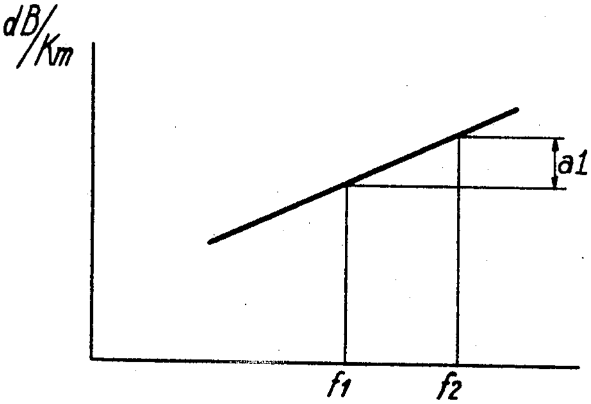
Fig. 1 is a graph of the attenuation characteristic curve for a mean average cable.

Fig. 1 shows for further explanation the attenuation characteristic curve of the mean average cable. On the abscissa is plotted the frequency, on the ordinate the attenuation in db/km. We assume that $f_2=2f_1$ (one octave) and the attenuation difference for these frequencies is for example $a^1$ db, the length of the cable section to be chosen is $p$ kms.; then $p.a^1$ must be 6 db per octave. In this case the slope of the attenuation curve is approximately equal to the slope of the amplification curve over the most important frequency range.

I. *Equalization features*

Figure 2:
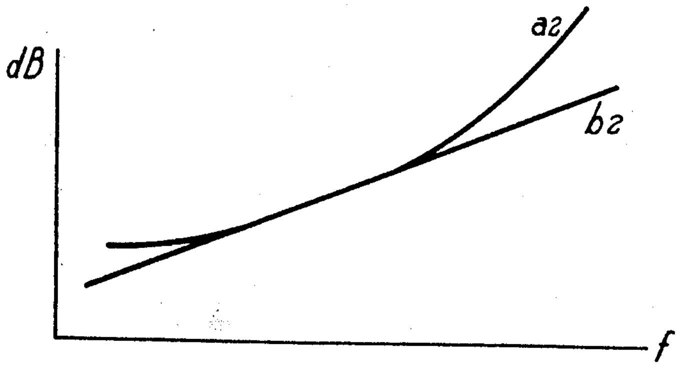
Fig. 2 is a graph of the comparison of the attenuation of a repeater section of a cable according to the present invention with respect to a slope of 6 db per octave.

A small correction is required for the maximum and the minimum frequency range (see Fig. 2). In this figure the frequency is plotted on a logarithmical scale on the abscissa and the attenuation in db on the ordinate; the line $a^2$ indicates the cable attenuation. Moreover, the amplification of an amplifier, having a capacitor C1 in the cathode lead as a negative feed-back element FB (see Fig. 6) is plotted on the ordinate; the line $b^2$ indicates the amplification. This repeater amplifier is connected to one pair of lines through connecting transformers T1 and T2 for one direction of transmission of a carrier. The voltage divider of resistances R2 and R3 (shunted by the large capacitor C2) provides the required bias voltage for the amplifier tube to allow for an excessive voltage drop in the resistor element R1 shown in the equalization feedback circuit FB. As is evident from the Fig. 2 the two lines are parallel to one another over a large frequency range.

Only the lowest and the highest frequencies require in this case a slight correction. For the high frequencies this may be obtained by providing a small inductor L1 in series with the capacitor C1. For the low frequencies provision may be made of a parallel resistor R1 (see Fig. 6). It should be noted here that thus for the most important part of the desired frequency range the negative feed-back is determined by a capacitor alone and in the highest part of the frequency range by a capacitor in series with a small inductor; this produces in each case a phase shift of substantially 90° in the negative feedback path, whilst in a small part of the desired frequency range (the lower part) the negative feed-back is determined by a capacitor with a parallel resistor; this produces a phase shift of materially less than 90°. Since conditions are not always the same, it will be necessary for both the capacitor C1 and the correction elements (inductor L1 and resistor R1) to be adaptable to the individual conditions; to this end they must be variable in some way or other.

The capacitor C1 must fulfil definite severe tolerance requirements; for the inductor L1 and the resistor R1 these tolerances may be much larger. The steps in which the inductor and the resistor must be variable may be much larger than those of the capacitor; it is therefore of importance that the equalization for the most important part of the frequency characteristic should be determined by the capacity, even if the capacitor alone does not suffice.

With existing systems the amplifier concerned usually has a total amplification of about 90 db and a negative feed-back of about 30 db, so that 60 db is left.

A one-tube amplifier has an amplification of about 40 db; if a negative feed-back of 30 db is subtracted, 10 db is left; this is not sufficient to fulfill the aforesaid conditions. The negative feed-back for the highest frequency is now chosen to be smaller; approximately 20 db, so that 20 db is left; this amplification is required to compensate the cable attenuation in the section length chosen. The reduced negative feed-back could lead to a reduced stability. The stability is also determined by the effect of variations (reduction) of the mutual conductance of the tube in the amplifier on the amplification. This variation in mutual conductance may be due to high age of the tube, variations in supply voltage, for example owing to fluctuations in the mains voltage or otherwise.

The effect of this variation in mutual conductance is, as is known, reduced strongly by using negative feed-back. With the amplifiers of the existing systems use is made of a high degree of negative feed-back.

With the amplifier to be used in the system according to the invention a lower degree of negative feed-back had to be used, as explained above, in order to obtain a single stage amplification; this could give rise to a decrease in stability.

As stated above, this negative feed-back method produces a phase shift of 90° for the largest and most important part of the desired frequency range.

Now the negative feed-back method in the system according to the invention (producing a phase shift of 90°) permits the use of a lower negative feed-back factor, the stability then obtained being nevertheless satisfactory (see Bell System Technical Journal, January 1934 and more particularly page 9, note E).

From the said article it appears that the stabilizing effect of the negative feed-back with a phase shift of 90° is materially better than with negative feed-back having a small phase shift. Towards the lower frequencies the phase angle deviates gradually more from 90°, but the cable attenuation then becomes small. Thus the degree of negative feed-back for the low frequencies must be higher and it becomes so high that the stability thus obtained is already more than sufficient. As stated above the total attentuation per cable section was about 25 db owing to the requirement that the slope of the attenuation characteristic curve should be approximately 6 db per octave.

The amplification produced by the amplifier to be used had also to be approximately 25 db.

II. *Amplification features*

Figure 3:
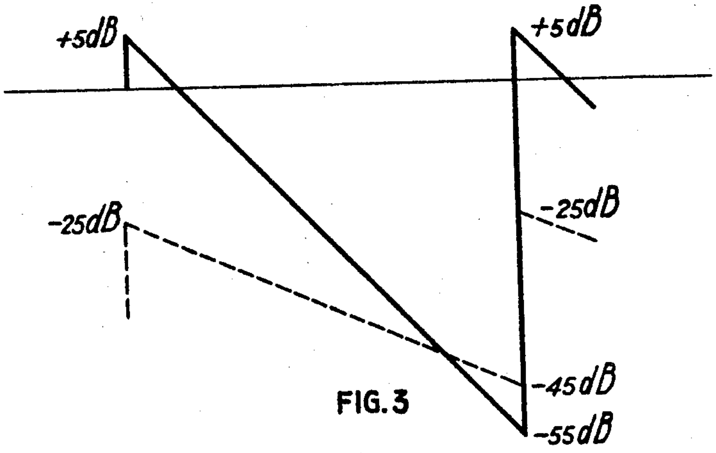
Fig. 3 is a graph of the comparison of noise levels in a repeater section of cable between a conventional prior art system and the system of this invention, the system of this invention being shown by a dotted line on the graph.

Now a sufficiently low intermodulation must be provided (see Fig. 3).

In Fig. 3 a level diagram is shown by the full curve for one of the existing systems, in which the cable damping is at a maximum about 60 db and the amplification thus also about 60 db. In order to exceed sufficiently the noise level, the lowest level lies at about −55 db, the highest level is then at about −5 db.

In one embodiment of the system according to the invention having an attentuation of about 20 db, the variation of the level diagram now lies between −25 db and −45 db (Fig. 3, broken line). With such a variation of the level diagram, the distortion owing to the curved tube characteristic will be materially reduced, so that inter alia the distortion due to intermodulation will be materially lower. The conventional formula for the curved tube characteristic is:

$$I_a = I_{ao} + av_g + bv_g^2 + cv_g^3 + \dots$$

With the amplifier of the system according to the invention $v_g$ is materially lower. If we assume a factor $p$, the square term is a factor $p^2$ smaller and the distortion $$\frac{p^2}{p} = p$$

times smaller, the third-power term is then a factor $p^3$ smaller and the distortion $$\frac{p^3}{p} = p^2$$

times smaller and so on.

Thus in the system according to the invention the third-power distortion in the tube characteristic does not play any part. This is favourable, since the third-power distortion products (more than the square products) lie within the range of adjacent channels and produce, moreover, partly intelligible cross-talk.

An additional advantage of the low level, also in the output transformer of the amplifier, resides in the fact that thus the non-linear distortion in the core of this transformer is reduced. This permits of reducing the dimensions of the core and hence of the complete transformer, which permits again a reduction of the number of turns and/or of the stray capacity and/or of the stray inductance. The result is that the relative bandwidth increases, or in other words that, the lowest frequency employed being maintained a wider frequency band can be transmitted.

This effect, which is known from the transistor technique (the levels being in this case in general also much lower) may be obtained also with amplifiers according to the invention to a certain extent with the use of normal amplifying tubes. As stated above, the system according to the invention permits of using high frequencies (up to 200 to 500 kc./s.) in both directions in the same cable in the same frequency band by means of a plurality of circuits.

III. *Circuit features*

The circuits to be used must then be selected to be such that they are more or less screened from one another by further circuits not employed for carrier-wave transmission. This, however, need not apply to the go and return circuits of the same carrier-wave system. If the same frequency band is used for the go and return circuit of the same speech channel, cross-talk between these two circuits will become manifest as an echo. Since the echo attenuation (side tone) of a telephone apparatus is, in general, not more than 10 to 15 db, the near-end cross-talk between go and return circuits of the same system need not be better than for example 25 db for the whole system.

From measurements referred to above it has been found that the near-end cross-talk between the two side-circuits of the same star-quad fulfils these requirements up to comparatively high frequencies.

According to the invention this may be utilized with advantage; in this manner more circuits can be occupied for carrier-wave systems than would otherwise be possible in a given cable. Moreover, it is more efficient to free the two wire pairs of a quad from loading coils than only one wire pair. If the two wire pairs can be used for carrier-wave operation, a smaller number of quads must be freed from loading coils in order to form a given number of carrier-wave circuits. Even if duplex circuits are used for carrier-wave transmission, a similar effect may be obtained, i.e. by using two adjacent four-wire groups for the go and return circuits, even if the cross-talk values would require the quads to be used for different carrier-wave systems to be separated by one or more groups through which no carier-wave operation takes place, or through which carrier-waves are transmitted only at much lower frequencies.

To a pair cable, of course, the same consideration applies.

In cases in which the system according to the invention is used for stretches which, if they sometimes form part of a very long connection, always lie near one of the ends of such a connection (for example a connection between a district exchange and a secondary exchange), the disturbing effect of the aforesaid cross-talk echo may be reduced to some extent by taking advantage of the fact that an echo, the transit time of which is very short, may be materially stronger than one having longer transit times.

By raising the level in the direction from the secondary exchange to the district exchange to a higher value than in the inverse direction, the cross talk from the first-mentioned direction to the other direction may be increased and decreased in the inverse direction.

The echo received back in the secondary exchange is amplified, but since we are concerned here with very short transit times ($<10$ micro seconds) an echo attenuation of only 10 db may suffice.

The echo reflected to the district exchange (where the line may be connected to a very long connection) is attenuated to the same extent, which is favourable, since this echo may yield a comparatively long transit time for the subscriber at the far end of the long connection, so that this echo is much more troublesome.

(*a*) GROUP FROGGING

A further possibility of suppressing a few cross-talk risks resides in the means to be used in accordance with the invention and designated by "group frogging," i.e. the leap-over in the cable from one group to another, having a twist length differing from that of the former, when passing through an amplifier. For the system according to the invention conductors of existing cables may be used and must to this end be freed from loading coils. A large part of the conductors, however, will be used as before for the low-frequency transmission. Through these conductors cross-talk is possible, i.e. (see Fig. 4*a*) from the carrier-wave connection (A) through low-frequency connection (B) to the carrier-wave connection (C). This so-called double near-end cross-talk is less troublesome, it is true, owing to the comparatively low amplification factor of the amplifiers according to the invention, than it would be with known amplifiers, but it may become troublesome, particularly if the conductors (A, B and C) have the same twist lengths.

From the measurements referred to above it has been found from well known phenomenon, that the cross-talk between groups or wire pairs having the same twist length, is stronger than in the case of a different twist length, and is accentuated for higher frequencies. By providing that both on the left-hand and on the right-hand side of the repeater point all conductors used for carrier-wave transmission and having the same twist length are connected to the input of the amplifiers concerned (see Fig. 4*b*), so that the outputs of the amplifiers are connected to conductors having a different twist length, it may be avoided that with this double cross-talk the troublesome cross-talk (between conductors of the same twist length) is produced twice.

In other words: by arranging that the same level prevails in the conductors of equal twist lengths on the left-hand and the right-hand side of the amplifiers, it is ensured that the double cross-talk, comprising twice the troublesome values between conductors of the same twist length, occurs only between points of equal levels, so that it is less disturbing than if it occurred between points having a level difference (equal to the amplification factor of the amplifier).

A certain analogy between this process and the "frequency frogging" used in the American N1-system is evident. Therefore the process described above is designated by "group-frogging."

It should be noted that the double cross-talk could also be suppressed by using low-pass filters in all conductors not used for carrier-wave operation. Since in the use described above of carrier-wave telephony in existing (low-frequency) cables, in general, the number of conductors remaining in use for low-frequency, will be larger than the number of carrier-wave conductors, this is a comparatively costly solution; by using "group frogging" combined with amplifiers having a low amplification factor (in accordance with the invention) the use of these filters will in general be avoidable.

(*b*) THE ENERGY SUPPLY TO THE REPEATERS

As stated above, the repeaters used in the system according to the invention must be arranged at comparatively small intervals. It is then required to supply energy through the cables, since a separate supply for each amplifier would render exploitation uneconomical. The system according to the invention is exactly suited for this method of energy supply, since: (1) the one-tube amplifiers require only a minimum amount of energy, and (2) the low level at the same time permits a low anode voltage. Both factors result in relative low voltages on the cable, thereby reducing cable losses and at the same time the danger in case of a faulty contact between conductors. Thus it is rendered possible in very many cases to use the same conductors for the transmission of the supply voltages as for the carrier-waves.

In the case of direct-current supply it is of course advantageous to connect the filament wires of a plurality of amplifiers in series. The filament wires of the tubes of the amplifiers in the go circuit and in the return of the same circuit are preferably connected in series. If the filament wire breaks down in an amplifier of the go circuit, the connection is interrupted and it is then unimportant that the return circuit should be disturbed as well. If, however, the filaments of the amplifiers of the two separate circuits were connected in series, the failure of one filament would cause both or two paths to be disturbed.

It is possible to separate completely the supply to the filament wires from the supply to the anodes of the tubes. If for example the filament wires of two tubes connected in series absorb $2\times18=36$ v. at 100 ma. and if the tubes function at 110 v. anode voltage, two tubes absorbing 20 ma. of anode current, then the case of combined supply, a voltage of 110 v. is required with a current absorption of 120 ma. At the beginning of the line there must prevail a voltage of 110 v.+ the total voltage drop across the supplying conductors with a current of 120 ma. in each amplifier.

By using wholly or partly different conductors for the supply to the filament wires than for the anode current, there is a considerably smaller voltage drop for the anode current. For the filament current the voltage drop becomes in this case greater, but since the filament wires require a lower voltage, this may nevertheless yield a favourable distribution, so that a lower supply voltage may suffice at the beginning of the line, if the same number of conductors is used (the same total copper cross-section as before).

The two circuits (anode circuit and filament wire circuit) may, as an alternative, be connected to one another in a manner such that the cathode current also passes through the filament wires. Then the total voltage is higher, it is true, but the total current consumption for each amplifier (pair) is restricted to the value of the filament current alone. This may sometimes be advantageous.

The system according to the invention offers attractive conditions for a satisfactory carrier-wave telephone transmission along existing cables, but its application need not be restricted thereto; the invention may also be used for the construction of new systems with new cables. The system according to the invention further more offers the possibility of bridging also short distance with the aid of carrier-wave telephone in an economical manner, but the use need not be restricted thereto; the system may also be used for bridging long distances. At first sight it may seem a disadvantage that the amplifiers are located at such short intervals (about 2.5 to 9 kms.), but compared with coaxial systems in which amplifier intervals of 7 to 15 kms. are not uncommon, the system according to the invention does not appear unfavourable, if it is considered that the said coaxial amplifiers comprise in general three tubes (stages), so that in this case the number of tubes per kilometre is higher than with the system according to the invention. The system according to the invention furthermore offers attractive possibilities for using on a large scale, transistors in the amplifying apparatus. These transistors require and produce little energy, which is quite in harmony with the system according to the invention having such a low amplification factor, combined with energy supply for the telephone transmission across the same conductors or not combined herewith.

(c) CABLES

The system according to the invention permits of dispensing with the operation with two frequency bands and of using the fact that when using the same band for the go and return circuits of the same telephone connection the near-end cross-talk between these two paths becomes only manifest as an echo phenomenon, or else of operating on a two-band method. From extensive cross-talk measurements carried out with the duplex circuits in quad cables, it has been found that these cross-talk values are materially more favourable than those for the side-circuits of the same groups. The effect of equal twist lengths is still marked, but it is considerably less pronounced than with the side-circuits.

Thus in a layer having for example 15 star quads (see Figs. 5*a* and 5*b*), having only three different twist lengths, use being made of the side circuits, only three quads may be used to for example 500 kc./s., whereas, with the use of duplex circuits five complete systems (go and return circuits) can be accommodated in this layer (Fig. 5*a*), all of which can be used up to 550 kc./s., the cross-talk values being even more favourable than those prevailing between the three side circuits.

Explanation to Fig. 5:

⊕ star-quad for carrier-wave transmission in the go direction;

⊙ star-quad for carrier-wave transmission in return direction;

○ star-quad group not used for carrier-wave transmission, but may be used for power or for low frequency signals (ordinary telephony).

The occupation then is as is indicated in Fig. 5*a*. Each time a pair of adjacent quads (1—2 I, 4—5 II, 7—8 III, 10—11 IV, and 13—14 V) is used for a complete carrier-wave system, the various systems are separated from one another by one quad or group.

Since groups 2 and 4 have the same twist length *b* (indicated by *a*, *b* and *c* within the ring) are are, moreover, closer to one another than groups 1 and 4 or 2 and 5 respectively, the traffic through groups 2 and 4 must have the same direction in accordance with the invention.

The same applies to groups 5, 7, 8, 10 and 11, 13. This cannot of course apply to groups 14 and 1 in connection with the odd number of carrier-wave systems. Since groups 14 and 1, however, have different twist lengths (in contradistinction to the other combinations) this is of little trouble.

Fig. 5*b* shows a further example on the same principle, in which, however, a layer having an even number of star quads (in this case 16) is used; herein only two different twist lengths *a'* and *b'* are used, as is common practice to do with low-frequency cables. It is at the same time assumed that the cross-talk values are slightly less favourable, so that each time two groups are required to separate adjacent carrier-wave systems. In this case the most adjacent groups of two different carrier-wave systems (for example groups 2' and 5') will be used for opposite directions, since they have different twist lengths.

Fig. 5*c* shows finally an embodiment of a possible use of the system according to the invention in a single carrier-wave cable of conventional star-quad construction, each quad having a different twist length. By applying the invention it may be achieved that (1) within one cable transmission may be effected in both directions, (2) very much higher frequencies may be used, so that, even if not all wire pairs are used for these high frequencies, yet a considerable number of channels can be transmitted.

As is evident from Fig. 5*c*, the groups 9'' to 12'' are used for carrier-wave operation in the go⊕direction and 5'' to 8'' in the return⊙direction.

Owing to the small length of the amplifying sections the indirect far-end cross-talk attains much lower values than with the normal use of carrier-wave cables. Thus it is not necessary to intermix the conductors of the inner layer and the outer layer, as is now common practice to do in order to equalize as much as possible the transit times of all circuits to suppress the effect of polarity changes. Thus also the conductors can be balanced up to much higher frequencies. Yet it is to be feared that the cross-talk within the group in excess of 200 to 300 kc./s. may be found to be inadmissible in spite of balancing, whilst also the near-end cross-talk between the side-circuits of adjacent groups, which cannot be balanced, may also remain inadmissibly high. Then the following occupation may be obtained: with the conductors *p* of groups 12'' and 5'' is formed a system of 12 to 204 kc./s. with 32 channels, also with the conductors *p* of groups 11'' and 6'', 10'' and 7'' and 9'' and 8''. The near-end cross-talk between side-circuits of the latter groups is, of course, not satisfactory for alien systems, but for the go and return circuits of the same system this may probably be sufficient to 200 kc./s. and probably to about 400 kc./s.

The side-circuits *q* of groups 12'' and 5'', 11'' and 6'' and 10'' and 7'' may be occupied each by a carrier-wave system of 12 to 528 kc./s. each having 80 channels. To the groups 12'' and 5'' applies again that the near-end cross-talk between them becomes manifest as echo, so that this is not critical. The cross-talk between 12'' and 6'', 11'' and 5'' is critical, but they are separated each by two alien groups, so that it may be expected that it is satisfactory. If desired, it may be reduced by using the side-circuits-*q* of groups 11'' and 6'' not up to 528 but for example up to 324 or 432 kc./s. for 48 or 64 channels respectively.

The groups 1'' to 4''+side-circuits *q* of groups 9'' and 8'' may, if desired, be used to much lower frequencies for carrier-wave operation, for example eight channels per group in the band of 24 to 72 kc./s. With all these systems exactly the same apparatus is used for the go and return circuits, which, of course, favours the simple survey of the final apparatus. In the most unfavourable case thus 2×80+48+4×32+5×8=376 channels may be transmitted through one cable. If the cross-talk values appear to be more favourable, the conductors *p* may be used up to for example 324 kc./s. for 48 channels each, while the conductors *q* of groups 11″ and 6″ may be used for transmitting 80 channels, thus in total 472 channels. With normal operation two cables would have offered 24×32=768 channels (also of the simplified carrier-wave system), i.e. 384 channels for each cable. The conventional system has the advantage of great uniformity in the final apparatus. On the other hand it requires two cables to begin with, even if the number of required channels is less than half the capacity of two cables. Even if the number required would be so high, that also with the application described above two cables were required, this system has the advantage that in the case of a breakdown of one of the two cables a larger number of channels remains intact than would be possible with the other system even with interchange.

In Fig. 5*d* a cross section of a layer of a cable is shown having three equidistant high frequency carrier quads A′, B′ and C′ 120° of arc apart and shielded by four quads of low frequency transmission circuits. With such shielding between the three high frequency carrier quads, each high frequency quad may contain the same length two pairs of wires with the pairs in each quad having different twist lengths so that both the go and return path may be transmitted in the same high frequency quad for each of three separate circuits corresponding to the quads A′, B′ and C′.

It is desirable at the repeater points (the repeaters being housed in outdoor cabinets) to lead in only the wire pairs which have to be repeatered.

(1) Thus splicing is economized.

(2) Unfavourable insulation values at these wires are avoided (this is unavoidable for the carrier-wave conductors, but of minor importance, since the characteristic impedance of these conductors is much lower than that of the low-frequency conductors including loading coils).

At the terminal stations it is also useful to introduce the carrier-wave conductors separately; on the one hand the normal leading-in cable (20″ cable) and the normal arrangement of the connectors on the cable terminations are not suitable for carrier-wave operation and on the other hand the carrier-wave cables must be terminated directly at the carrier-wave cable structure, i.e. at a different location.

Consequently, the carrier-wave conductors must be spliced in the ground in a special branch cable. This branch cable must fulfill severe cross-talk requirements (with respect to near-end cross-talk at very high frequencies); this is obtained only with great difficulty if no screening is used.

According to the invention use is made of a cable of the same type as the main cable or of another suitable type comprising many more conductors than required for carrier-wave transmission; for the carrier-wave transmission conductors are chosen in the same positions as those of the carrier-wave conductors in the main cable or conductors in a corresponding position. Thus favourable cross-talk values are ensured and the impedance matches accurately.

*IV. Comparative examples*

In the following table a comparison is established between two embodiments (A) and (B) of the system according to the invention with the N1-system. The highest frequency of the embodiment (A) (204 kc./s.) corresponds to that of the 48-channel system used in the Netherlands, so that the embodiment (A) may, if desired, be included as a link in the normal carrier-wave cable mains without the need for the further means. Since with respect to economy this system is also suitable for carrier-wave operation at short distances, for which the N1-sytem is particularly designed, the number of channels in the cable is 32, which number is obtained by using the so-called simplified carrier-wave system, in which a much cheaper terminal apparatus may be used at the cost of a slightly wider frequency band per channel (6 kc./s. instead of the conventional 4 kc./s.) (the terminal apparatus is, moreover, considerably cheaper than that of the N1-system). This is, of course, of particular importance for short-distance connections.

A comparison with the N1-system on the basis of 48 channels with embodiment (A) (this comparison would be even more favorable for the latter) was useless, since the line amplifiers of the N1-system cannot be used in conjunction with the conventional final apparatus, so that the N1-system cannot be included as a link in the normal carrier-wave cable mains.

The embodiment (B) shows that owing to the low power, a much wider frequency band can be transmitted by the repeater. It has been found that the manufacture of a repeater according to the invention for a frequency band of 12 to 500 to 700 kc./s. does not give rise to special difficulties. It should be noted here that the number of channels may rise from 56 to 80 (the simplified carrier-wave apparatus being maintained), if the cross-talk values permit it, as will for example be the case, if the transmission is performed through duplex circuits in star-quad cables.

In the last two columns of the comparison table, the comparison is based on the number of tubes in each line amplifier. It could be stated that this comparison is disturbed by the fact that the repeaters according to the invention are distributed over a greater number of areas. However, the repeaters of the N1-system are much more complicated, since they comprise not only the two repeaters but also a quartz oscillator, two modulators and a few filters.

To give some idea of the performance obtainable with the system according to the invention, suppose it were applied to a stretch of cable with a conductor-diameter of

*Survey of one embodiment of the invention compared with the N1-system for the same type of cable (0.8 mm.)*

| Type of system | Highest freq., kc./s. | Number of channels per line system | Number of wire-pairs used | Maximum gain of channels per wire-pair without loading coils | Specific damping of 0.8 conductors, db/km. | Max. damping (at the highest freq.), db | Length of the repeater section, km. | Number of tubes per repeater pair | Number of tubes per km. | Number of tubes per channel km. |
|---|---|---|---|---|---|---|---|---|---|---|
| Emb. (A) | 204 | 32 | 2 | 15 | 4.9 | 22 | 4.5 | 2 | 0.445 | 0.0139 |
| Emb. (B) | 528 | 56 | 2 | 27 | 8.3 | 22 | 2.6 | 2 | 0.77 | 0.0137 |
| N1 | 256 | 12 | 2 | 5 | 5.6 | 62 | 11. | 5 | 0.455 | 0.0378 |

These numbers are based on 6 kc./s. per channel (so-called simplified carrier-wave system).

In determining this number it is assumed for safety's sake that in the band from 204 to 528 kc./s. the cross-talk values would require separate frequency bands for the go and return circuits; below 204 kc./s., however, the same frequency diagram is used for the go and return circuits.

0.8 mm. (roughly corresponding to gauge 20 or 15.5 pounds/mile). If the highest frequency to be used would be 204 kc./s. (the highest frequency of this standardized carrier system, using 48 channels with a spacing of 4 kc. per channel or 32 channels, using the so called simplified carrier system, with 6 kc. spacing), the repeater spacing would have to be 4.5 km. at a maximum attenuation of 22 db. Then the number of repeater tubes per km. would be: 0.445 (including go and return-repeaters).

With the 6 kc. spacing system (which is specially suited for cooperation with the transmission system according to the invention, because both are primarily intended for relatively short distances), the number of repeater tubes per channel-km. would be 0.0139. With the standard 4 kc. terminal equipment ths figure would be reduced to 0.0096. The maximum number of repeaters to be power-supplied from one supply point would be 4, because the supply voltage would have to be limited to 220 volts. Therefore the largest distance between two supply points would be $4+1+4=9\times$ the repeater section length or $9\times4.5=40.5$ km.

If, however, the highest frequency would be 528 kc./s. (this being a significant upper limit for the 6 kc.-terminal equipment) the number of 6 kc. channels per system would be raised to 56, if we assume that the near-end cross-talk values in the cable do not allow using the same frequency-band to go- and return-working, for frequencies over 204 kc./sec., so that between 204 and 528 a different frequency-band would have to be used for each direction. Again limiting the attenuation per repeater-section to 22 db, the length of the sections becomes: 2.6 km. Thus, the number of repeater tubes per km, becomes: 0.77, and the number of tubes per channel-km.: 0.0137. The number of repeater-points that can be supplied from one supply point is now 5, owing to the reduced voltage drop per section, because of the reduced length. Therefore, the maximum distance between supply-points now becomes: $(5+1+5)\times2.6=11\times2.6$ km.= 26.6 km.

It should be remarked that the manufacture of single-stage repeaters for a frequency band of 12—500 or 700 kc./sec. has not given rise to any great difficulties.

Because the scope of application of the system according to the invention is comparable with the N1-system it seems right to compare the above figures with those obtained from the N1-system. We then get:

The highest frequency is 256 kc./sec.
The number of channels 12.
Length of the repeater-section: 11 km.

The number of tubes per repeater-point being 5, the number of tubes per km. will be: 0.455, but the number of tubes per channel-km. will be 0.0378, that is nearly 3 times as much as in either realization according to the invention.

Because the power consumption of the repeaters is such that only one repeater-point can be supplied over the same wires, the maximum distance between supply points is $3\times11=33$ km.

Apart from these figures, in the N1-system, not only the repeater equipment is much more complicated (comprising an oscillator, 2 modulators and a number of filters, over and above practically the same general equipment as a repeater-point according to the invention) but also special terminal equipment is required, including companders, whereas a system according to the invention can work with ordinary terminal equipment, either standard (4 kc./sec. spacing) or so called simplified (6 kc./sec. spacing), or almost any other.

With respect to the energy supply, we may observe that with the N1-system, owing to its comparatively high current consumption, only one repeater can be fed through the same conductor. Thus the supply points cannot be spaced farther from one another than $3\times11=33$ kms.

With the embodiment (A), use being made of the same supply voltages and the same conductors, at least four repeaters can be fed in tandem from one supply point, so that in this case the supply points can be spaced apart by $9\times4.5=40.5$ kms.

While there is described above the principles of this invention in connection with specific apparatus, it is to be clearly understood that this description is made only by way of example and not as a limitation to the scope of this invention.

What is claimed is:

1. A system for transmission of multi-channel carrier telephony over a low frequency cable comprising a plurality of quads of wires for each channel, each quad comprising two pairs of wires forming a go and return circuit, each circuit of said quads having an attenuation of about six decibels per octave, and repeaters spaced at intervals along said cable in each of said circuits so that the maximum attenuation of said circuits over their normal carrier frequency range between adjacent repeaters is less than thirty decibels, each repeater comprising: a single-stage amplifier having an amplification of less than thirty decibles and a power level of less than .05 milliwatts for each channel, and a negative feedback equalization network matched to the circuit to which it is connected; said wire pairs in said cable being systematically selected for each carrier channel so that each quad of wires for each carrier channel contains wires of at least two different twist lengths and the two pairs of each channel quad are screened from each other to eliminate cross-talk balancing; and means for supplying power for said repeaters over said cable.

2. A system according to claim 1 wherein said equalization network comprises a capacitor.

3. A system according to claim 2 wherein said equalization network includes an inductance in series with said capacitor.

4. A system according to claim 2 wherein said equalization network includes a resistor in parallel with said capacitor.

5. A system according to claim 2 wherein said equalization network includes both an inductance in series with said capacitor and a resistor in parallel with said capacitor.

6. A system according to claim 1 wherein said selected wire pairs for each carrier channel are screened by at least one pair of wires selected for low frequency transmission.

7. A system according to claim 1 wherein said cable has separate screened layers of quads of wires and said wire pairs selected for separate carrier channels are screened from each other by being located in said separate layers in said cable.

8. A system according to claim 1 wherein said wires connected to both sides of a repeater are so arranged that those wires carrying equal frequency levels have the same twist length and those carrying unequal frequency levels have different twist lengths.

References Cited in the file of this patent

UNITED STATES PATENTS

| | | |
|---|---|---|
| 502,262 | Patterson | July 25, 1893 |
| 957,506 | Hall | May 10, 1910 |
| 1,768,248 | Green | June 24, 1930 |
| 1,993,758 | Stillwell | Mar. 12, 1935 |
| 2,081,427 | Firth et al. | May 25, 1937 |
| 2,245,492 | Meyer | June 10, 1941 |

FOREIGN PATENTS

| | | |
|---|---|---|
| 425,639 | Great Britain | Mar. 19, 1935 |

OTHER REFERENCES

Albert: Electrical Communication, 2nd ed., John Wiley and Sons, Inc., New York, 1940. (Copy in Div. 69, pages 442 and 459 relied on.)